US011836544B2

United States Patent
Sayyed et al.

(10) Patent No.: US 11,836,544 B2
(45) Date of Patent: Dec. 5, 2023

(54) MULTI-TENANT FIRMWARE AND HARDWARE UPDATE EXCHANGE USING BDAT SCHEMA

(71) Applicant: Dell Products L.P., Round Rock, TX (US)

(72) Inventors: Ibrahim Sayyed, Georgetown, TX (US); Sumanth Vidyadhara, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 136 days.

(21) Appl. No.: 17/385,598

(22) Filed: Jul. 26, 2021

(65) Prior Publication Data
US 2023/0029924 A1 Feb. 2, 2023

(51) Int. Cl.
*G06F 9/54* (2006.01)
*G06F 9/455* (2018.01)
*G06F 9/4401* (2018.01)

(52) U.S. Cl.
CPC ............ *G06F 9/542* (2013.01); *G06F 9/4411* (2013.01); *G06F 9/45558* (2013.01); *G06F 2009/45579* (2013.01)

(58) Field of Classification Search
CPC .... G06F 9/542; G06F 9/4411; G06F 9/45558; G06F 2009/45579
See application file for complete search history.

(56) References Cited

U.S. PATENT DOCUMENTS

| 6,980,944 | B1 * | 12/2005 | Oshins | G06F 30/33 703/21 |
| 2010/0162242 | A1 * | 6/2010 | Grouzdev | G06F 9/4411 718/1 |
| 2015/0212826 | A1 * | 7/2015 | Miyabe | G06F 12/1433 713/1 |
| 2017/0102959 | A1 * | 4/2017 | Bramley, Jr. | G06F 9/45558 |
| 2019/0079558 | A1 * | 3/2019 | Huang | G06F 13/4072 |
| 2019/0391799 | A1 * | 12/2019 | Samuel | G06F 1/266 |
| 2020/0257541 | A1 * | 8/2020 | Jayakumar | G06F 13/1668 |

OTHER PUBLICATIONS

BIOS Data ACPI Table (BDAT), Interface Specification v.4.0, Nov. 2020, 67 pages. (Year: 2020).*

* cited by examiner

*Primary Examiner* — Kevin L Young
*Assistant Examiner* — Carina Yun
(74) *Attorney, Agent, or Firm* — Jackson Walker L.L.P.

(57) ABSTRACT

An information handling system may include at least one processor, a Basic Input/Output System (BIOS), a physical information handling resource, and a computer-readable medium having instructions thereon that are executable by the at least one processor for: executing an operating system (OS) that includes a BIOS Data Advanced Configuration and Power Interface (ACPI) Table (BDAT) driver; executing at least one virtual machine (VM) that includes a virtual BDAT driver; detecting an event notification generated by the physical information handling resource; and transmitting, to the VM, information regarding the event notification via the BDAT driver and the virtual BDAT driver.

15 Claims, 5 Drawing Sheets

MULTI-TENANT FIRMWARE AND HARDWARE UPDATE EXCHANGE USING BDAT SCHEMA

TECHNICAL FIELD

The present disclosure relates in general to information handling systems, and more particularly to managing communications between virtual machines (VMs) and other components of information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is important for information handling systems to be able to communicate device notifications, updates, security messages, etc. from platform hardware (e.g., any information handling resource) to the operating system (OS). However, some restrictions currently exist regarding communications from VMs to the OS, and from the OS to the platform hardware. For example, VMs typically do not have direct access to hardware resources or notifications from hardware to the VMs, because of the limited or fixed Advanced Configuration and Power Interface (ACPI) functionality that is exported to VMs from the OS and the security of the entire platform hardware. This limits the actual use cases and the data and control channels from VMs to the hardware in current implementations.

The OS handling of platform notifications either to perform firmware updates or push a notification from platform hardware to the OS typically requires a well-defined architecture using either ACPI or UEFI runtime services. There are several limitations in using ACPI tables, however. For example, any changes to the ACPI tables requires a platform reset, newer schema require a lengthy process to be approved by the ACPI working group, and runtime updates are not possible.

This may be mitigated by using BIOS Data ACPI Table (BDAT) schema for some of the custom notification and handling. However, this solution does not cover the VMs, firmware updates, and the security of the system using this schema. It is a generic schema to distinguish the newer runtime data for the platform.

Thus embodiments of this disclosure may use this schema to define a new, proprietary, vendor-specific data exchange format for the platform notifications (e.g., from a VM to the OS to the hardware). Embodiments may provide a new architecture for runtime platform notifications, security mitigations for each VM profile, as well as OS and firmware updates as part of the platform IQ of the entire device. (For purposes of this disclosure, the term "vendor" should also be understood to include retailers, resellers, manufacturers, OEMs, and the like.)

It is to be noted that various terms discussed herein are described in the Advanced Configuration and Power Interface (ACPI) Specification version 6.4, which was released in January 2021 (hereinafter, ACPI Specification), which is hereby incorporated by reference in its entirety. One of ordinary skill in the art with the benefit of this disclosure will understand its applicability to other specifications (e.g., prior or successor versions of the ACPI Specification). Further, some embodiments may be applicable to different technologies other than ACPI.

Further, various terms discussed herein are described in the BIOS Data ACPI Table (BDAT) Interface Specification version 4.0 Draft 5, which was released in November 2020 (hereinafter, BDAT Specification), which is hereby incorporated by reference in its entirety. One of ordinary skill in the art with the benefit of this disclosure will understand its applicability to other specifications (e.g., prior or successor versions of the BDAT Specification). Further, some embodiments may be applicable to different technologies other than BDAT.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with managing communications between VMs and other components of information handling systems may be reduced or eliminated.

In accordance with embodiments of the present disclosure, an information handling system may include at least one processor, a Basic Input/Output System (BIOS), a physical information handling resource, and a computer-readable medium having instructions thereon that are executable by the at least one processor for: executing an operating system (OS) that includes a BIOS Data Advanced Configuration and Power Interface (ACPI) Table (BDAT) driver; executing at least one virtual machine (VM) that includes a virtual BDAT driver; detecting an event notification generated by the physical information handling resource; and transmitting, to the VM, information regarding the event notification via the BDAT driver and the virtual BDAT driver.

In accordance with these and other embodiments of the present disclosure, a method may include an information handling system that includes a Basic Input/Output System (BIOS) and a physical information handling resource executing an operating system (OS) that includes a BIOS Data Advanced Configuration and Power Interface (ACPI) Table (BDAT) driver; the information handling system executing at least one virtual machine (VM) that includes a virtual BDAT driver; the information handling system detecting an event notification generated by the physical information handling resource; and the information handling system transmitting, to the VM, information regarding the event notification via the BDAT driver and the virtual BDAT driver.

In accordance with these and other embodiments of the present disclosure, an article of manufacture may include a non-transitory, computer-readable medium having computer-executable code thereon that is executable by a processor of an information handling system that includes a Basic Input/Output System (BIOS) and a physical information handling resource for: executing an operating system (OS) that includes a BIOS Data Advanced Configuration and Power Interface (ACPI) Table (BDAT) driver; executing at least one virtual machine (VM) that includes a virtual BDAT driver; detecting an event notification generated by the physical information handling resource; and transmitting, to the VM, information regarding the event notification via the BDAT driver and the virtual BDAT driver.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
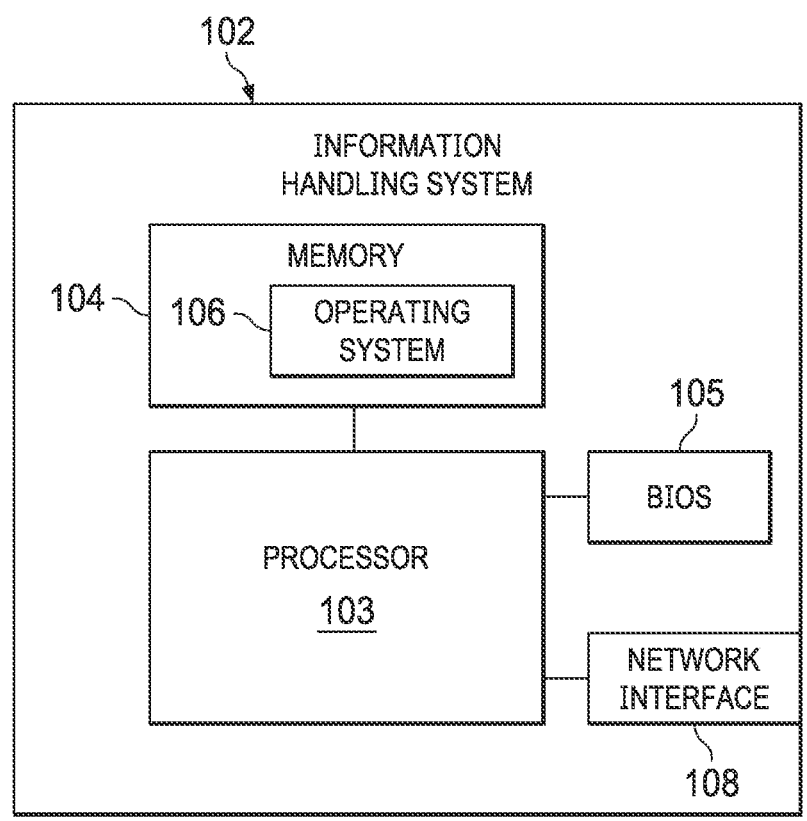
FIG. 1 illustrates a block diagram of an example information handling system, in accordance with embodiments of the present disclosure.

Preferred embodiments and their advantages are best understood by reference to FIGS. 1 through 5, wherein like numbers are used to indicate like and corresponding parts. For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile and/or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Figure 2:
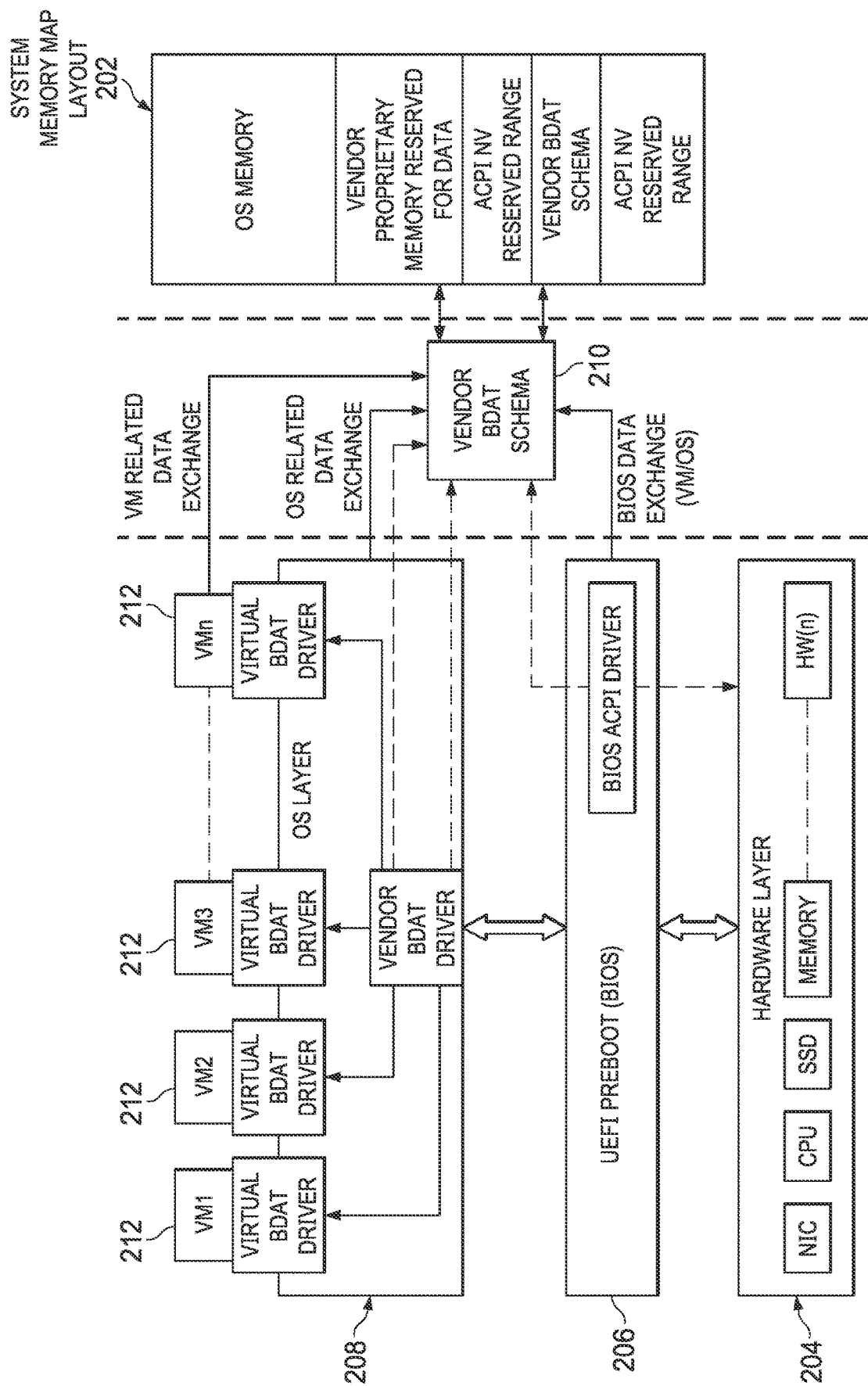
FIG. 2 illustrates a block diagram of an example BDAT architecture, in accordance with embodiments of the present disclosure.

Turning now to FIG. 2, a block diagram is shown of an example architecture, according to some embodiments. Hardware layer 204 includes the various hardware components of the system. A BIOS ACPI driver at BIOS layer 206 interacts with vendor BDAT schema 210, as does a vendor BDAT driver at OS layer 208. Further, virtual BDAT drivers (e.g., one per VM 212) may also interact with vendor BDAT schema 210 via the vendor BDAT driver.

As shown, memory-mapped regions of the system memory map layout 202 may be reserved and exposed using a vendor-specific BDAT schema table, which may include the ACPI reserved memory range for the OS for handling vendor-specific platform actions (e.g., VM events, OS-specific events for firmware updates, security schema for VMs, firmware update mechanisms for vendor-specific peripherals from the OS, etc.).

According to some embodiments, a vendor secure memory region may be accessed based on authentication between a VM, OS, and a platform BIOS by using the architecture shown in FIG. 2. A secure reserved memory region of system memory map layout 202 may be synced to the platform IQ as well as to a local disk based on platform configuration. This region may store device and platform software IQ from various VMs, the OS, and the BIOS, as well as hardware update information. This information may be made available seamlessly to the VMs, the OS, and the platform BIOS.

The BDAT schema may be considered as the control plane in this architecture, and the vendor proprietary memory the data plane. Access to the data plane may be authenticated using secure authentication methods.

Figure 3:
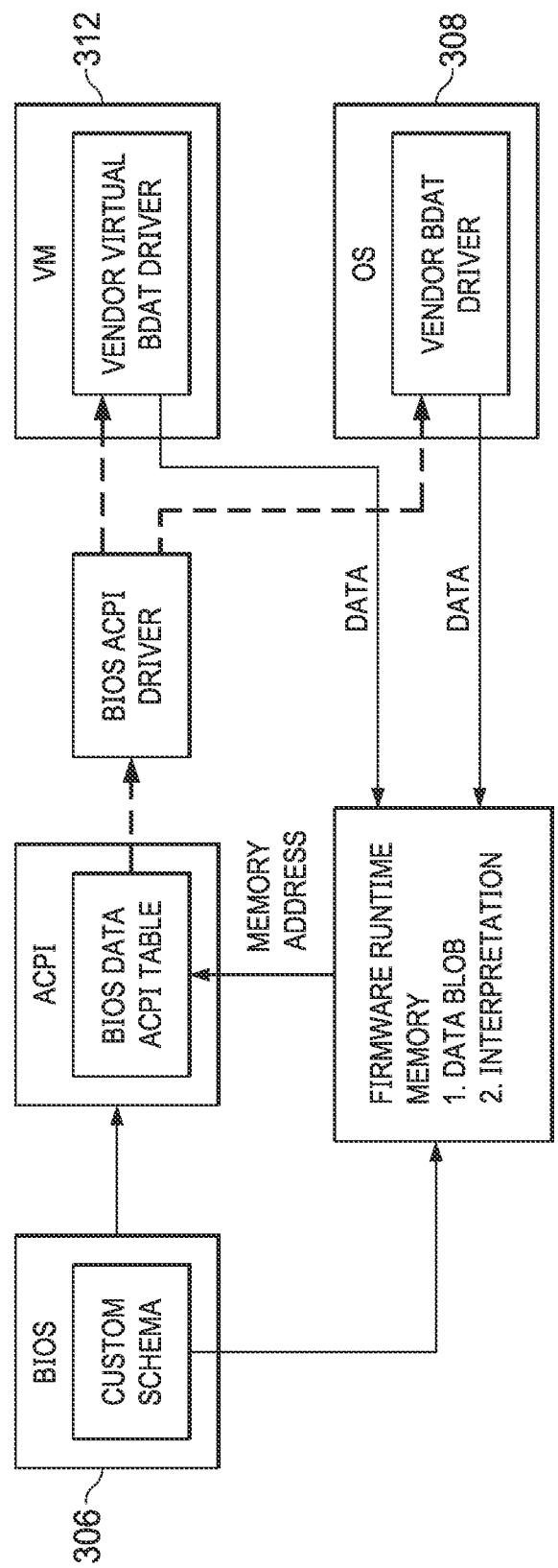
FIG. 3 illustrates a block diagram of BDAT drivers accessing a custom schema, in accordance with embodiments of the present disclosure.

Turning now to FIG. 3, a block diagram is shown of BDAT drivers accessing a custom schema. One possible example schema is shown below at Listing 1.

```
{
"EventName" : " BIOSIQ_AUTO_HEAL_EVENT",
"ScenarioName" : "MitigationMemory",
"Data" :
[
{
"MemoryBlockStartAddress" : "<Address in Hex>",
"MemoryBlockEndAddress" : "<Address in Hex>",
"TotalSize" : "<Size in Bytes>",
"MfgId" : "<ID>",
"ModelNum":"<ID,>"
"SerialNum" : "<Serial Number>",
"MemType" : "ECC" | "Non-ECC",
"MemTech" : "DDR3" | "DDR4" | "<OtherMemTechs>"
}
]
}
```

Listing 1.

In some embodiments, securing of the vendor proprietary memory region and BDAT layout may be accomplished as follows.

A secure key may be retrieved in a VM by allowing the virtual BDAT driver to communicate with the vendor BDAT driver. The vendor BDAT driver may query the platform using Windows Management Instrumentation (WMI) in some embodiments. The secure key is retrieved, and the driver may call to a protected memory region. The vendor-specified BDAT table may be a part of the ACPI table in the Differentiated System Description Table (DSDT), which has the unique BDAT-specific unique identifiers (UIDs) for the vendor-specific specific algorithm.

In some embodiments, a memory range may be reserved for a vendor-specific data blob in a unique identification area.

This specific range of memory may be reserved based on platform policy.

In particular, during the platform boot process, memory may be reserved for the vendor-specific memory range. This may create a unique mapping of UIDs and the active memory region with authentication for vendor-specific binary data. UIDs may be named accordingly for different use cases such as in embodiments using platform IQ use cases and/or system update use cases. During the boot process, the OS may execute a vendor-specific driver, which may translate the vendor BDAT schema to a specific use case for the OS or a VM running on the OS.

As one example, a VM may access the platform security controls using a vendor-specific schema to send a WMI call to the OS layer, which may interpret the WMI call as a vendor-specific BIOS data table schema layout and translate it to a vendor proprietary hardware mapping to a hardware-related event or specific actions.

The VM may handle events or WMI calls in the VM layer, which may translate them to an OS-specific WMI driver from the vendor to handle the hardware-specific and firmware-specific use cases.

The BDAT Specification provides a starting point to an open standard, in that it provides standard ACPI headers and consists of vendor-specific schemas. Schemas are essentially UUID-based (or GUID-based) data structures. The UUID identifies the type of data associated with the schema (e.g., serial presence detect (SPD), dual inline memory module (DIMM), WiFi hardware, LOM hardware, etc.) Multiple schemas may be arranged together to form a coherent data structure, and BDAT schemas provide flexibility in defining new data formats.

As shown in FIG. 3, BIOS 306 may copy a custom schema inside reserved memory and update the address into the ACPI BDAT table. The schema data interpretation may be carried out by the custom BDAT driver.

The BIOS reserved memory may have two address regions: the Intel BDAT table contains the memory address pointing to the data blob of the schema, and the actual data blob which has the schema may reside in a vendor proprietary memory region reserved for data. The data blob may have multiple schemas, and each schema may be associated with a unique UUID (or GUID).

One embodiment of this disclosure may be employed in a Platform IQ use case. The BIOS may interact with each of a plurality of VMs via separate regions of ACPI virtual memory.

A custom OEM schema may be created inside the BDAT for internal firmware updates, so that only vendor-specific OS/firmware can interact, interpret, and take necessary actions based on the schema. Platform IQ details may be added to the BDAT based on the platform-specific configuration and redirected to a specific VM or to the "external world." A correlation may be created from the VM to Platform IQ events. These events may be mapped to specific VMs to enable the creation of powerful analytics.

A BDAT schema may be created with platform-specific configurations for each particular VM and its association. A BDAT schema can create specific WMI handlers for specific VMs, allowing a BDAT schema for the VM context. Events coming out from each VM may be tracked and identified from a particular hardware element. Further, a BDAT schema may be created to hook a particular VM and Platform IQ event for a particular hardware element with a specific schema. Thus the complete associate may be created from hardware to OS to BIOS to VM.

All of the events that interact with the hardware may be tracked like ACPI/WMI/firmware through the centralized Platform IQ logic. This provides a mechanism to interact with and interpret the defined BDAT schema to understand the hardware mapping.

Another embodiment of this disclosure may be employed in a system update use case. WPBT may be used in one embodiment, but there are several ways to exchange data from the firmware to the OS. The BDAT table may be used to exchange data from the firmware to an OS-specific region. This may allow specifying an OEM-specific firmware schema for data payloads to the OEM-specific OS driver, such as a data cache unit (DCU) to retrieve this schema to understand the firmware dependencies for the OS drivers to be updated.

In one embodiment, a specific OEM ACPI table may be used to handle the firmware exchange of data to a vendor-specific OS driver. The boot-critical drivers may be updated in the EFI (Extensible Firmware Interface) system partition (ESP). The schema of the layout may be exchanged from the BIOS to OS-specific drivers via ACPI tables, some of which are OEM-specific, and some of which are generic ACPI tables such as BDAT.

Figure 4:
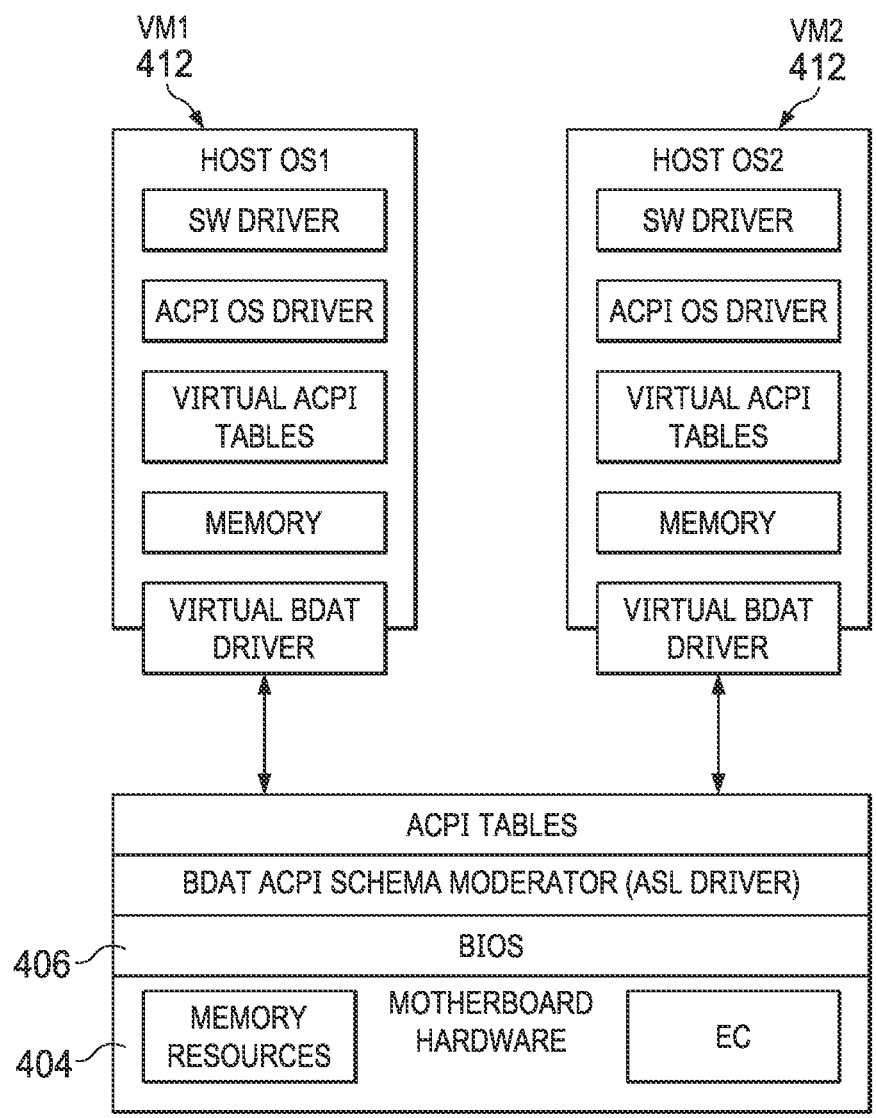
FIG. 4 illustrates a block diagram of two VMs accessing ACPI tables, in accordance with embodiments of the present disclosure.

Turning now to FIG. 4, a schematic illustration is shown of VMs 412 interacting with hardware 404 via BIOS 406. The interaction is enabled via ACPI tables using a flexible custom vendor-specific BDAT schema.

Figure 5:
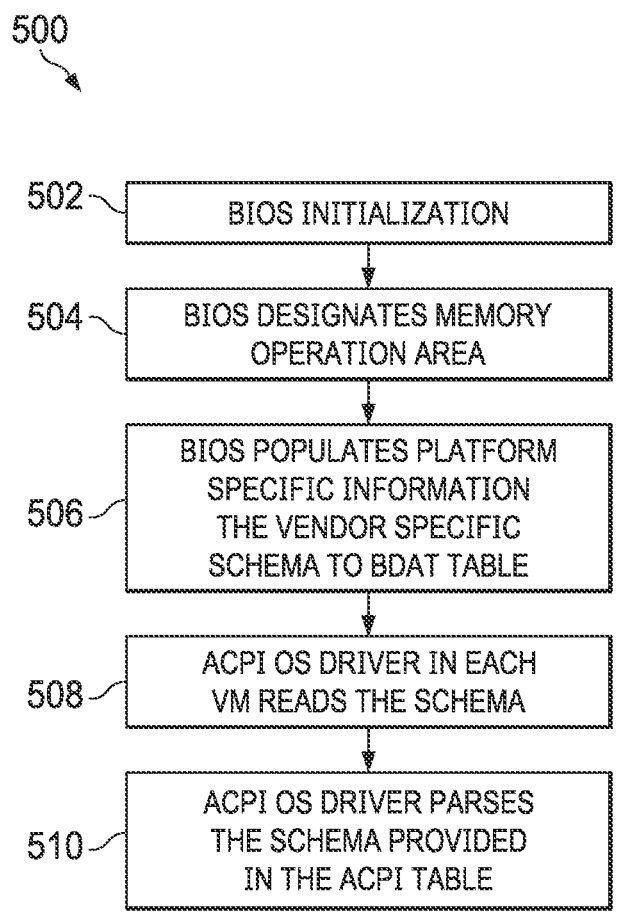
FIG. 5 illustrates an example process flow, in accordance with embodiments of the present disclosure.

Turning now to FIG. 5, a flow chart is shown of an example method 500, in accordance with some embodiments of this disclosure. At steps 502 and 504, upon system power-on, the BIOS may initialize and designate a runtime memory operation area. At step 506, the BIOS may populate platform-specific information on the vendor-specific schema to the BDAT table. The BIOS may present the BDAT table which has vendor-specific information while the system is booting to the OS.

At step 508, an ACPI OS driver (e.g., a vendor-specific BDAT driver) may read the BDAT ACPI table through standard Windows ACPI driver services. At step 510, an ACPI OS driver (e.g., a virtual BDAT driver executing inside a VM) may parse the schema present in reserved memory region.

In one embodiment, the schema interpretation may be carried out by the Virtual BDAT driver residing in each VM. Each VM may have its structure based on how to do data interpretation. For example, if VM 1 needs SSD information and VM 2 needs flash information, each VM may have its own data interpretation defined in the BDAT schema.

Thus the method of FIG. 5 may rely on components such as a Virtual BDAT driver, a vendor-specific BDAT driver, a BIOS ACPI driver, a vendor proprietary memory reserved area, and a vendor BDAT schema.

One of ordinary skill in the art with the benefit of this disclosure will understand that the preferred initialization point for the method depicted in FIG. 5 and the order of the steps comprising that method may depend on the implementation chosen. In these and other embodiments, this method may be implemented as hardware, firmware, software, applications, functions, libraries, or other instructions. Further, although FIG. 5 discloses a particular number of steps to be taken with respect to the disclosed method, the method may be executed with greater or fewer steps than depicted. The method may be implemented using any of the various components disclosed herein (such as the components of FIG. 1), and/or any other system operable to implement the method.

Embodiments of the present disclosure may provide for many advantages. For example, one embodiment may provide a method for Platform IQ based on modern device functionality to handle events in a VM, an OS, or a pre-boot region. An embodiment may provide a protected access mechanism between the VM and hardware events or from the OS to hardware-related events based on a vendor proprietary memory range architecture and a vendor-specific BDAT schema. An embodiment may provide a method to handle platform update and platform IQ at runtime.

BIOS IQ and serviceability use cases may also be enabled, such as modern client, firmware update, and device notifications at the VM and the OS level.

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Unless otherwise specifically noted, articles depicted in the drawings are not necessarily drawn to scale. However, in some embodiments, articles depicted in the drawings may be to scale.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
   at least one processor;
   a Basic Input/Output System (BIOS);
   a physical information handling resource; and
   a computer-readable medium having instructions thereon that are executable by the at least one processor for:
   executing an operating system (OS) that includes a BIOS Data Advanced Configuration and Power Interface (ACPI) Table (BDAT) driver;
   executing at least one virtual machine (VM) that includes a virtual BDAT driver;
   detecting an event notification generated by the physical information handling resource; and
   transmitting, to the VM, information regarding the event notification via the BDAT driver and the virtual BDAT driver, wherein the transmitting includes transmitting the information according to a vendor-specific BDAT schema via a secure reserved memory region of a memory map of the information handling system by:
      the BDAT driver querying the information handling system to retrieve a key associated with the secure reserved memory region;
      the BDAT driver transmitting the key to the virtual BDAT driver of the VM; and
      the VM accessing the secure reserved memory region with the key.

2. The information handling system of claim 1, wherein the information handling system is configured to execute a plurality of VMs each including a respective virtual BDAT driver.

3. The information handling system of claim 1, wherein the BIOS is a Unified Extensible Firmware Interface (UEFI) BIOS.

4. The information handling system of claim 1, wherein the BDAT driver is configured to communicate with the physical information handling resource via Windows Management Instrumentation (WMI).

5. The information handling system of claim 1, wherein the BDAT driver is a vendor-specific BDAT driver.

6. A method comprising:
   executing, at an information handling system that includes a Basic Input/Output System (BIOS) and a physical information handling resource, an operating system (OS) that includes a BIOS Data Advanced Configuration and Power Interface (ACPI) Table (BDAT) driver;
   executing, at the information handling system, at least one virtual machine (VM) that includes a virtual BDAT driver;
   detecting, at the information handling system, an event notification generated by the physical information handling resource; and
   transmitting, from the information handling system and to the VM, information regarding the event notification via the BDAT driver and the virtual BDAT driver, wherein the transmitting includes transmitting the information according to a vendor-specific BDAT schema via a secure reserved memory region of a memory map of the information handling system by:
      the BDAT driver querying the information handling system to retrieve a key associated with the secure reserved memory region;
      the BDAT driver transmitting the key to the virtual BDAT driver of the VM; and
   the VM accessing the secure reserved memory region with the key.

7. The method of claim 6, further comprising executing a plurality of VMs each including a respective virtual BDAT driver.

8. The method of claim 6, wherein the BIOS is a Unified Extensible Firmware Interface (UEFI) BIOS.

9. The method of claim 6, wherein the BDAT driver is configured to communicate with the physical information handling resource via Windows Management Instrumentation (WMI).

10. The method of claim 6, wherein the BDAT driver is a vendor-specific BDAT driver.

11. An article of manufacture comprising a non-transitory, computer-readable medium having computer-executable code thereon that is executable by a processor of an information handling system that includes a Basic Input/Output System (BIOS) and a physical information handling resource, the code configured to cause the processor to carry out steps for:
   executing an operating system (OS) that includes a BIOS Data Advanced Configuration and Power Interface (ACPI) Table (BDAT) driver;
   executing at least one virtual machine (VM) that includes a virtual BDAT driver;
   detecting an event notification generated by the physical information handling resource; and
   transmitting, to the VM, information regarding the event notification via the BDAT driver and the virtual BDAT driver, wherein the transmitting includes transmitting the information according to a vendor-specific BDAT schema via a secure reserved memory region of a memory map of the information handling system by:

the BDAT driver querying the information handling system to retrieve a key associated with the secure reserved memory region;

the BDAT driver transmitting the key to the virtual BDAT driver of the VM; and the VM accessing the secure reserved memory region with the key.

12. The article of claim 11, wherein the information handling system is configured to execute a plurality of VMs each including a respective virtual BDAT driver.

13. The article of claim 11, wherein the BIOS is a Unified Extensible Firmware Interface (UEFI) BIOS.

14. The article of claim 11, wherein the BDAT driver is configured to communicate with the physical information handling resource via Windows Management Instrumentation (WMI).

15. The article of claim 11, wherein the BDAT driver is a vendor-specific BDAT driver.

* * * * *